United States Patent
Srivilliputtur Mannarswamy et al.

(10) Patent No.: US 9,342,295 B2
(45) Date of Patent: *May 17, 2016

(54) DYNAMIC SOFTWARE UPDATES

(71) Applicant: Hewlett Packard Enterprise Development LP, Houston, TX (US)

(72) Inventors: Sandya Srivilliputtur Mannarswamy, Bangalore (IN); Sujoy Saraswati, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/965,373

(22) Filed: Dec. 10, 2015

(65) Prior Publication Data

US 2016/0098268 A1    Apr. 7, 2016

Related U.S. Application Data

(63) Continuation of application No. 13/453,238, filed on Apr. 23, 2012, now Pat. No. 9,256,419.

(51) Int. Cl.
*G06F 9/44* (2006.01)
*G06F 9/445* (2006.01)

(52) U.S. Cl.
CPC ........................... *G06F 8/67* (2013.01)

(58) Field of Classification Search
CPC ............... G06F 8/65; G06F 8/67; G06F 8/68; G06F 11/1433
USPC .......................................................... 717/168
See application file for complete search history.

(56) References Cited

U.S. PATENT DOCUMENTS

| | | | |
|---|---|---|---|
| 5,790,856 A * | 8/1998 | Lillich | G06F 8/65 717/163 |
| 6,594,822 B1 | 7/2003 | Schweitz et al. | |
| 7,328,007 B2 | 2/2008 | Rajaram | |
| 7,581,217 B2 | 8/2009 | Jhanwar et al. | |
| 2003/0236794 A1 | 12/2003 | Hostetter et al. | |
| 2004/0107416 A1* | 6/2004 | Buban | G06F 8/68 717/170 |
| 2005/0066023 A1* | 3/2005 | Sakurai | G06F 8/65 709/223 |

(Continued)

OTHER PUBLICATIONS

Altekar, G., et al., OPUS: Online Patches and Updates for Security, University of California Berkeley, Jun. 6, 2005.

(Continued)

*Primary Examiner* — Duy Khuong Nguyen
(74) *Attorney, Agent, or Firm* — Dickinson Wright, PLLC

(57) ABSTRACT

A method, and a corresponding system, for dynamically updating software while the software is running by automatically dividing a patch into a plurality of micro-updates using compiler analysis. The method includes providing the patch which includes updates to several variable units of the software, including functions, type definitions, and data stores. Next, an interference graph of the patch is generated by creating a node corresponding to each variable unit of the patch and creating connected components by adding edges connecting variable units having an impact expression with a non-zero intersection. The patch is divided into the micro-updates, where each micro-update corresponds to a connected component. The micro-updates are then applied to the software when the variable units of the micro-update are at a safepoint, and at least two of the micro-updates are applied at different times while the software is running.

15 Claims, 8 Drawing Sheets

(56) References Cited

U.S. PATENT DOCUMENTS

| | | |
|---|---|---|
| 2006/0048130 A1 | 3/2006 | Napier |
| 2007/0061372 A1 | 3/2007 | Appavoo et al. |
| 2007/0220510 A1 | 9/2007 | Bell |
| 2008/0201705 A1 | 8/2008 | Wookey |
| 2010/0162226 A1 | 6/2010 | Borissov |
| 2010/0251378 A1* | 9/2010 | Eker .................. G06F 21/14 726/26 |
| 2011/0126179 A1 | 5/2011 | Hartman et al. |
| 2011/0239195 A1 | 9/2011 | Lin et al. |
| 2012/0054734 A1 | 3/2012 | Andrews et al. |

OTHER PUBLICATIONS

Hicks, M.; Dynamic Software Updating; http://www.win.tue.nl/~hmel/SoftwareUpdate/DynamicSoftwareUpdatingPhDThesis.pdf>: 2001.

Lee, I., "Dymos: A Dynamic Modification System", 1983, 163 pgs.

Arnold, J. et al., "Ksplice: Automatic Rebootless Kernel Updates," Massachusetss Institute of Technology, Oct. 24, 2010, 12 pgs., www.ksplice.com/doc/ksplice.pdf.

Neamtiu, I. et al; Practical Dynamic Software Updating for C; http://www.cs.umd.edu/~neamtiu/pubs/pldl06neamtiu.pdf > On pp. 72-83; vol. 41; Issue: 6; Jun. 14, 2006.

* cited by examiner

DYNAMIC SOFTWARE UPDATES

RELATED APPLICATION

This patent application is a continuation of U.S. patent application Ser. No. 13/453,238 entitled Dynamic Software Updates, filed Apr. 23, 2012, now pending. The disclosure of this patent application is incorporated by reference in its entirety.

BACKGROUND

Dynamic software updates for large software applications typically include changes to several functions, type definitions, and data structures. The larger the patch, the longer it takes to apply the dynamic software update. This time delay is an inconvenience for the programmer or end user of the software application.

DESCRIPTION OF THE DRAWINGS

The detailed description will refer to the following drawings in which like numbers refer to like objects, and in which.

DETAILED DESCRIPTION

Disclosed herein is a system and method for applying a dynamic software update, also referred to as a dynamic patch, to software or software applications of a suitably programmed device, such as a computer, while the software is running. The software to be updated provides operating instructions to other software or hardware of the computer. The operating instructions are formed by code, which includes variable units, such as functions, type definitions, and data structures. More specifically, the software includes threads with stacks for storing and executing the variable units over a period of time to provide the operating instructions. A variable unit is active when the stacks of the threads are executing the variable unit and inactive when the stacks of the threads are not executing the variable unit.

The dynamic patch includes modifications to one or more variable units of the software, and each modification to a particular variable unit is applied to the software during a point in time when the particular variable unit is inactive. The time period during which a particular variable unit of the software is inactive, while other variable units of the software may be active, is referred to as a safepoint, or an update point for the particular variable unit. A safepoint is also a point at which an update can be applied to the running application without causing any correctness issues in the running application.

Figure 1:
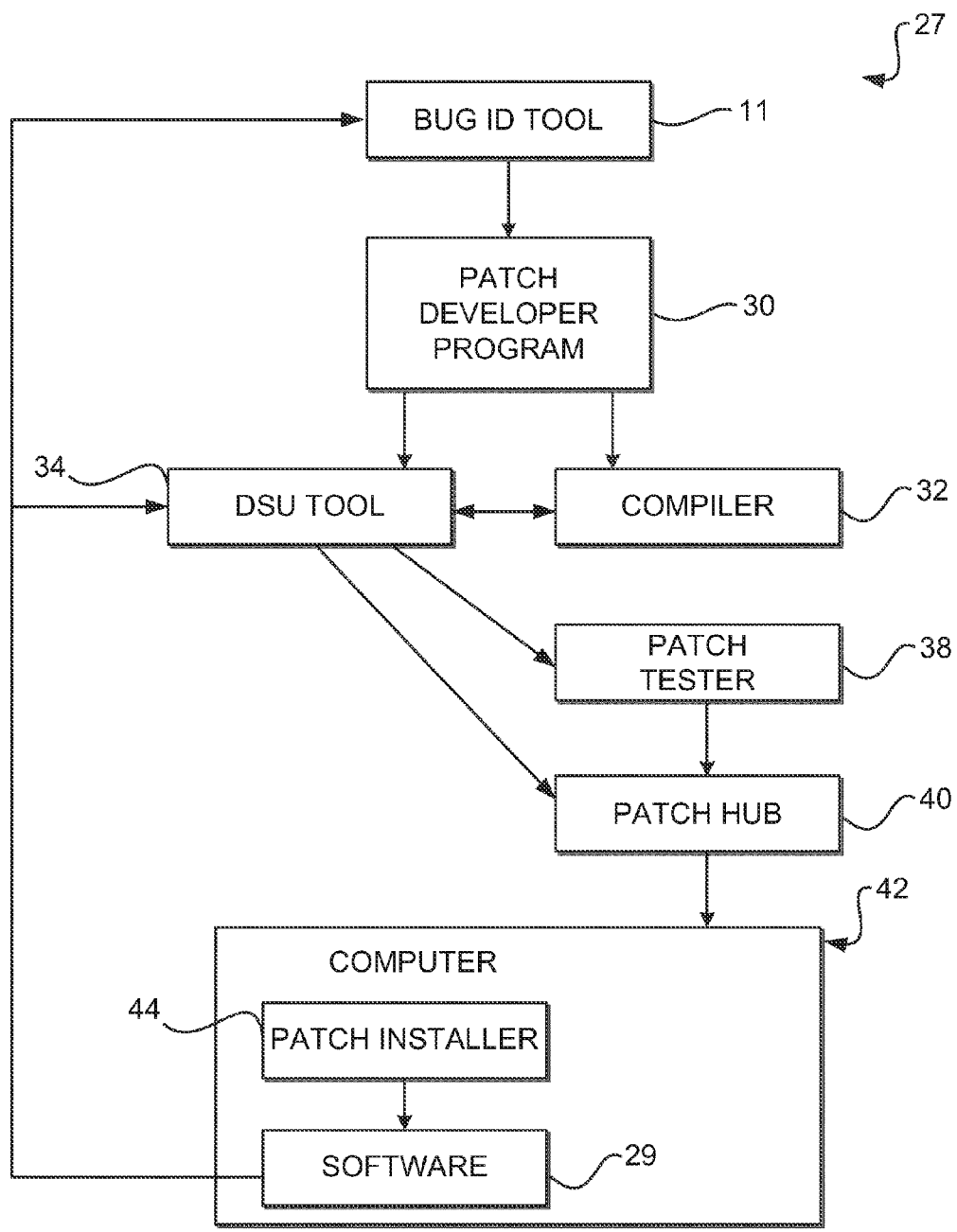
FIG. 1 illustrates an embodiment of a system used to dynamically update software.

FIG. 1 illustrates an exemplary system 27 for dynamically updating software 29. The system 27 includes a bug identification tool 11, a patch developer program 30, a Dynamic Software Update (DSU) tool 34, a compiler 32, a patch tester 38, a patch hub 40, and a computer 42. The computer 42 contains a patch installer 44 and the software 29 to be updated.

A computer engineer may use the bug identification tool 11 to identify a bug or defect in the software 29. The patch developer program 30 of the system 27 is then used to create a dynamic patch that fixes the bug by modifying one or more variable units of the software 29. The bug identification tool 11 may provide information to the patch developer program 30 to assist the patch developer program 30 in creating the dynamic patch.

The DSU tool 34 of the system 27 of FIG. 1 is a software application. It receives the dynamic patch from the patch developer program 30 and obtains a copy of the original unmodified software, including the sources of the software 29. The sources consist of the application source, which is the source code of the software 29 application in a high level language, for example C or C++. The DSU tool 34 then prepares to apply the dynamic patch to the software 29. First, the DSU tool 34 invokes the compiler 32 by providing the dynamic patch and the copy of the original unmodified software, as well as the sources, to the compiler 32. The compiler 32 then uses this information to construct an interference graph and divide the dynamic patch into one or more microupdates based on the interference graph.

To build the interference graph, the compiler 32 receives the dynamic patch and the copy of the unmodified software as inputs and analyzes the inputs. The compiler 32 may analyze the unmodified software 29 by generating mod/ref information, points-to information, and call graph information for the software.

The mod/ref information includes the set of memory locations that may be modified (mod set information) or referenced by routines of the software 29. For example, upon receiving the copy of the unmodified software, the compiler 32 may automatically analyze the software 29 and create the mod/ref information for each routine of the software 29.

The points-to information includes a set of points-to sets for all the pointers of the software 29. A points-to analysis is used to determine the points-to information. The analysis is performed by the compiler 32 and is a mechanism of statically computing the points-to sets of pointers in the software 29.

A pointer in a general purpose language, such as C or C++ is declared as T *ptr where ptr is the name of the pointer variable and T is the type of the variable it points to. Thus, a pointer declared as int *ptr can point to a variable of type integer. A pointer is also a program variable whose r-value is the address of another variable. An r-value is a data value that is stored at some address in memory. A pointee is a program variable whose address is the r-value of a pointer. A pointer is said to point to a pointee. For example, in the statement, "int x; int* y=&x", y is a pointer variable and x is the pointee, pointed to by y. If there are no other assignments to y in the program, then the points-to set of y consists of x, ie, y points to x.

Each pointer is associated with the set of pointees it is pointing to, this is known as its points-to sets. A points-to fact or a points-to pair is a pointer-pointee relationship between two, but not necessarily distinct, program variables. The set of all points-to facts for a pointer constitutes its points-to set. The sets for all the software pointers constitute the points-to information.

A call graph is a directed graph that represents calling relationships between functions in an application. Each node represents a function and an edge, for example (a, b), which indicates that function a calls function b in the software application. A cycle in the call graph indicates a recursive function. Thus, the call graph includes an analysis of the software and provides valuable information about the software.

After generating the mod/ref information, points-to information, and call graph information for the software 29, the compiler 32 uses the information to generate an impact expression for each variable unit, such as each function or data variable, being updated or modified by the dynamic patch. The impact expression indicates how the update or modification of the particular variable unit impacts the software 29. For example, an impact may be a change to a state of the software 29 represented by code execution or data structure modification, and the impact expression may be represented as the set of statements modified by the change in a function, or the set of abstract memory locations referenced or modified by that change, either directly or indirectly. For example, a function call statement 'foo' calling 'bar' in a patch may represent the impact of executing 'bar' in a future invocation of 'foo'. The compiler 32 may also contain information about the variable units of the dynamic patch and knowledge of the dependencies between the variable units, and may use this knowledge and information to create the impact expressions.

Figure 2:
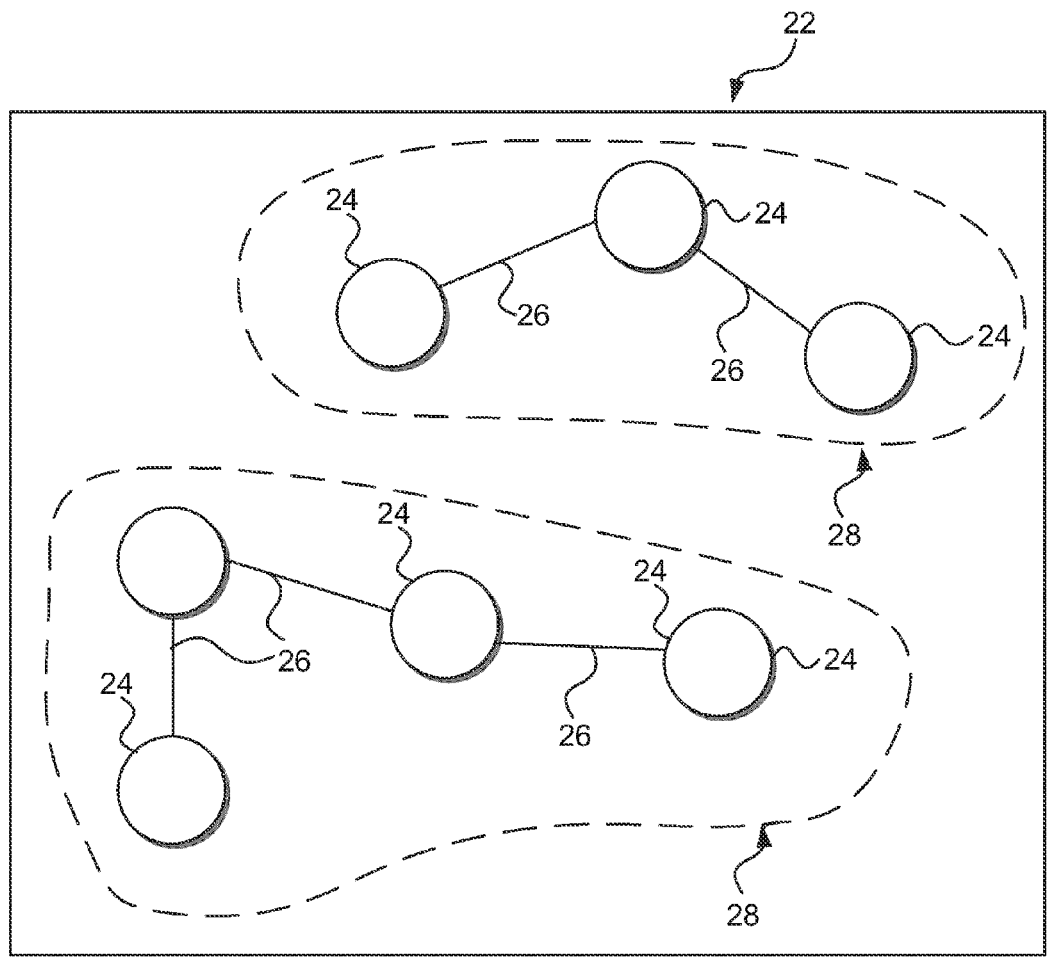
FIG. 2 illustrates an exemplary interference graph.

After generating the impact expressions for each variable unit of the dynamic patch, the compiler 32 then uses the impact expressions to construct the interference graph. An example of an interference graph 22 is shown in FIG. 2. The interference graph 22 includes a node 24 representing each variable unit being updated or modified by the dynamic patch. Each node 24 is also associated with the impact expression generated for the particular variable unit.

The purpose of the interference graph 22 is to itemize the dynamic patch and determine which nodes 24, representing variable unit modifications, should be applied to the software 29 together, or at the same time. Two or more nodes 24 should be applied together if the impact expression associated with the nodes 24 has a non-zero intersection. A non-zero intersection occurs when the impact expression of two nodes 24 intersects. For example, a non-zero intersection occurs between two nodes 24 if the updates associated with those nodes 24 both modify the same set of statements in the software 29, or both modify the same set of abstract memory locations in the software 29.

Thus, the compiler 32 analyzes the impact expressions of the nodes 24 to determine which impact expressions have non-zero intersections. The variable units represented by the nodes 24 having non-zero intersections have a common impact on the software 29. Next, the compiler 32 generates edges 26 connecting the nodes 24 having non-zero intersections. For example, two independent functions f1 and f2 may both call a new version of 'bar' in the patch, and therefore an edge 26 exists between the nodes 24 representing f1, f2, and bar in the interference graph 22. In another example, two nodes 24 of the interference graph 22, representing globals 'a' and 'b', accessed in two different functions f1 and f2, may have an no intersection of impact, such that the intersection of impacts is NULL. The compiler 32 may use a standard algorithm to find the edges 26 between the nodes 24.

The interference graph 22 of FIG. 2 illustrates an example of two groups of connected nodes 24, which are each referred to as a connected component 28. A connected component 28 is two or more nodes 24 that are connected by one or more edges 26. FIG. 2 shows one connected component 28 with four nodes 24 and three edges 26, and another connected component 28 with three nodes 24 and two edges 26. A connected component 28 indicates that that there is a non-zero intersection of the impact expressions of the nodes 24. The non-zero intersection means that the corresponding nodes 24 should be dynamically patched together. Further, all the nodes 24 in a single connected component 28 should be dynamically patched together atomically, meaning that those nodes 24 should be patched together in one shot, or at one instant of time, and not at multiple different instants of time.

In addition to indicating how the update or modification of the particular variable unit impacts the software 29, the impact expressions may provide some indication as to which variable units are active or inactive at the same time while the software is running, which in turn may indicate which variable units have common safepoints. For example, the variable units represented by the nodes 24 of a connected component 28 may all be inactive simultaneously during one or more common instances of time while the software 29 is running. However, the compiler 34 does not determine the safepoints for the nodes 24 of the connected components 28. This determination is conducted by the patch installer 44 prior to applying the dynamic patch to the software 29.

Once the compiler 32 identifies the connected components 28, the compiler 32 divides the dynamic patch into micro-updates each corresponding to one of the identified connected components 28. Each connected component 28 identified by the compiler 32 in the interference graph 22 corresponds to one micro-update. The compiler 32 may identify two or more connected components 28 and thus divide the connected components 28 into two or more micro-updates. Each micro-update includes one or more changes to one or more variable units. All of the variable unit changes of a micro-update are applied to the software 29 together, at the same time, and independent of the other micro-updates. For example, if the dynamic patch is divided into two micro-updates, then the first micro-update may be applied at time a and the second micro-update may be applied at time b, which is after time a.

If the compiler 32 generates two or more micro-updates, then the compiler 32 transmits the micro-updates to the DSU tool 34. However, if the interference graph 22 includes only one connected component 28, then the compiler 32 generates only one micro-update and informs the DSU tool 34 that it is not possible to divide the dynamic patch into two or more micro-updates. In this case, the DSU tool 34 proceeds to apply the dynamic patch at a single instant of time.

Once the DSU tool 34 receives the micro-updates, it may further prepare the dynamic patch for installation by sending the dynamic patch, including all of the micro-updates, to the patch tester 38. The patch tester 38 identifies and corrects any errors in the dynamic patch. A computer software engineer of a software service provider typically controls the bug identification tool 11, patch developer program 30, compiler 32, DSU tool 34, patch processor 36, and patch tester 38.

The dynamic patch may be transmitted from the patch tester 38 to the patch hub 40. Alternatively, the DSU tool 34 may send the dynamic patch directly to the patch hub 40. The patch hub 40 is typically maintained by a system administrator who controls the software 29 to be updated by the patch. The dynamic patch is then transmitted from the patch hub 40 to the computer 42 containing the software 29 to be updated. The dynamic patch is typically provided in a source file of a computer-readable medium. In the system 27 of FIG. 1, the computer 42 includes a patch installer 44, which receives the source file and applies the dynamic patch to the software 29. The patch installer 44 is shown as being part of the computer 42, but may be separate from the computer 42, or provided to the computer 42 in a computer-readable medium. The patch installer 44 then provides each of the micro-updates to the software 29 when the variable units of the micro-update are at safepoint.

The patch installer 44 determines if the software 29 is at a safepoint prior to applying the micro-updates. This determination is made while the software 29 is running and while the dynamic patch is being applied to the software 29. A micro-update is applied to the software 29 only when the software 29 is at a safepoint for all of the nodes 24 in the connected component 28 corresponding to that micro-update. The software 29 is at a safepoint for a particular micro-update when each of the variable units to be changed or modified by the micro-update is inactive. There is at least one safepoint common to all of the variable units of a micro-update. At least two of the micro-updates have different safepoints and thus may be applied to the software 29 independently of one another and at different times while the software 29 is running.

The patch installer 44 may use a standard algorithm to determine whether the software program is at a safepoint for each of the variable units to be changed or modified by a micro-update. One method of determining whether the software is at a safepoint includes an active function check. The patch installer checks to ensure that none of the functions to be updated by the dynamic software update are currently active or being executed on the active stacks of the currently active threads of the software application. In an alternate embodiment, a programmer may specify when the safepoints occur, at which point the update can be applied.

Figure 3:
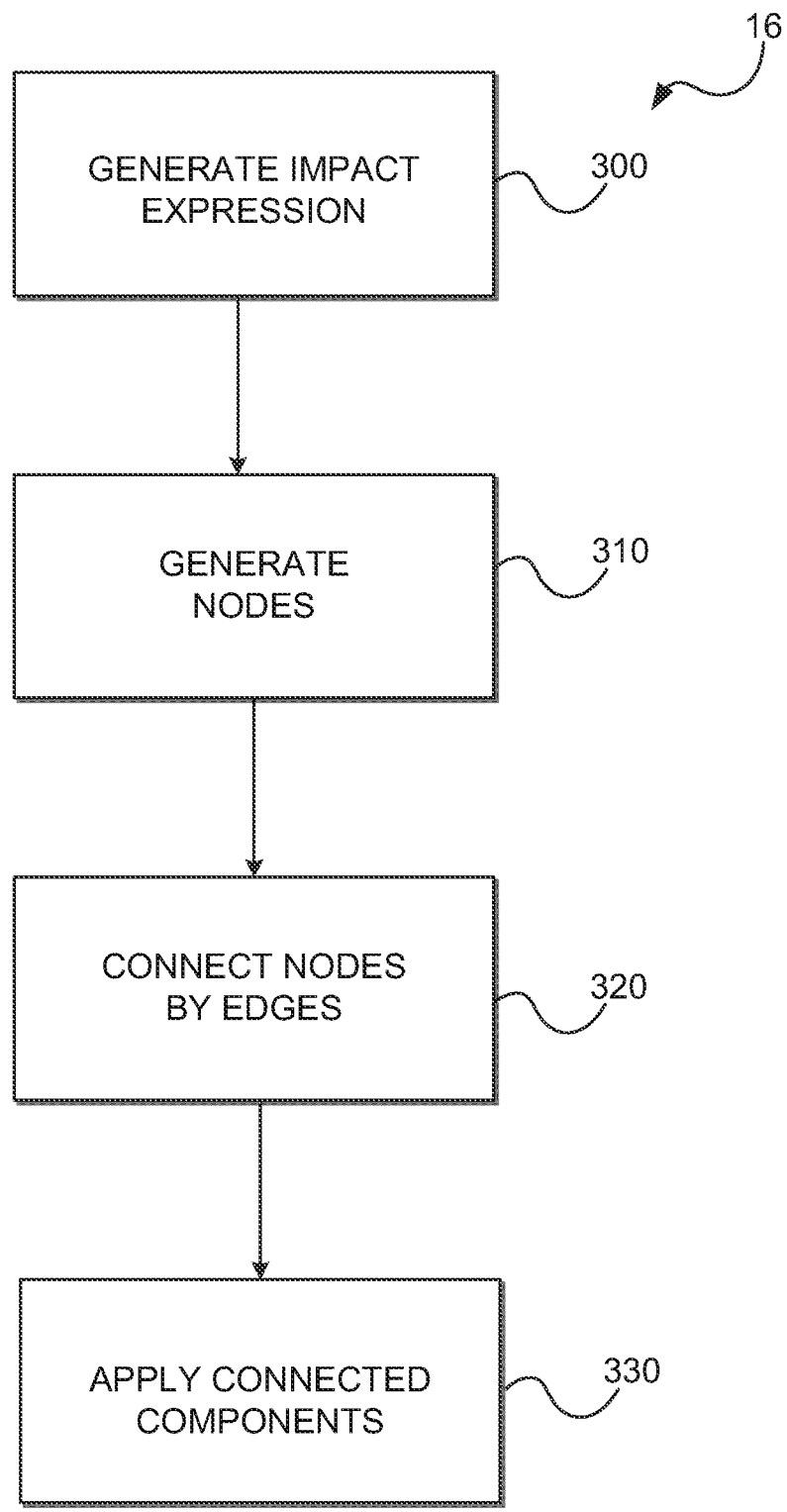
FIG. 3 is a flow chart illustrating an embodiment of a method for dynamically updating software.

FIG. 3 illustrates an exemplary method 16 for updating software while the software provides operating instructions to a computer. The method first includes generating an impact expression for each variable unit of a dynamic software update or dynamic patch (Block 300). The method next includes generating a node on an interference graph for each variable unit and associated impact expression (Block 310), and connecting nodes having impact expressions with a non-zero intersection by edges (Block 320), wherein one or more connected nodes is a referred to as a connected component. The method further includes applying one or more of the connected components to the software independent of any other connected components (Block 330).

Figure 4:
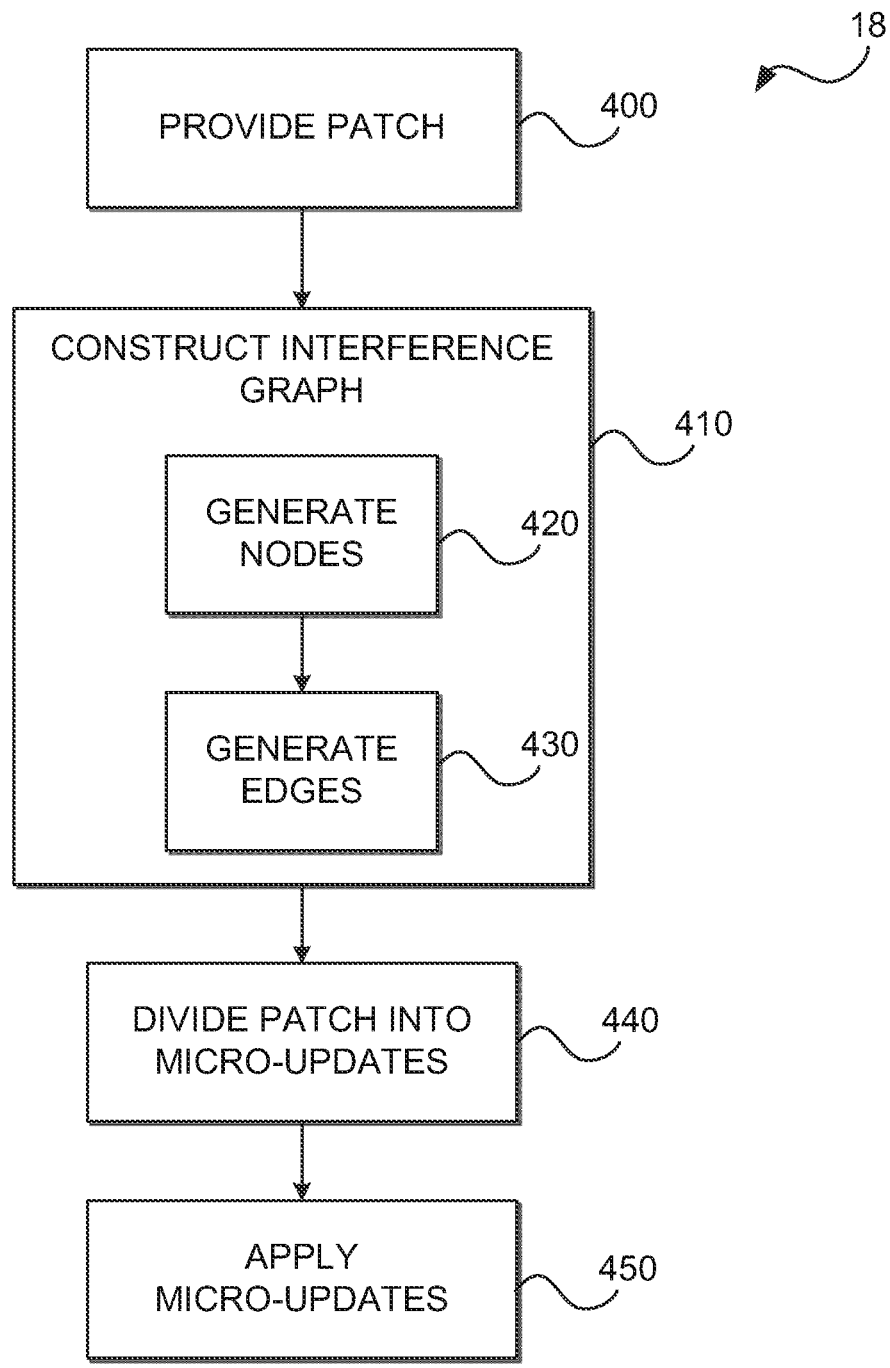
FIG. 4 is a flow chart illustrating another embodiment of a method for dynamically updating software.

FIG. 4 illustrates another exemplary method 18 for dynamically updating software, which may be implemented by the system 27 of FIG. 1. The method comprises providing a dynamic patch including several updates to variable units of the software (Block 400), and constructing an interference graph of the dynamic patch (Block 410). Constructing the interference graph includes generating a node corresponding to each variable unit of the dynamic patch (Block 420), and then creating connected components by generating one or more edges connecting nodes having impact expressions with a non-zero intersection (Block 430). One or more connected nodes is referred to as a connected component. The edges connect variable units that may have a similar impact on the software and thus may be inactive at the same time. Next, the method includes dividing the dynamic patch into several micro-updates each corresponding to one of the connected components (Block 440), and applying at least two of the micro-updates to the software at different times while the software is running (Block 450).

Figure 5:
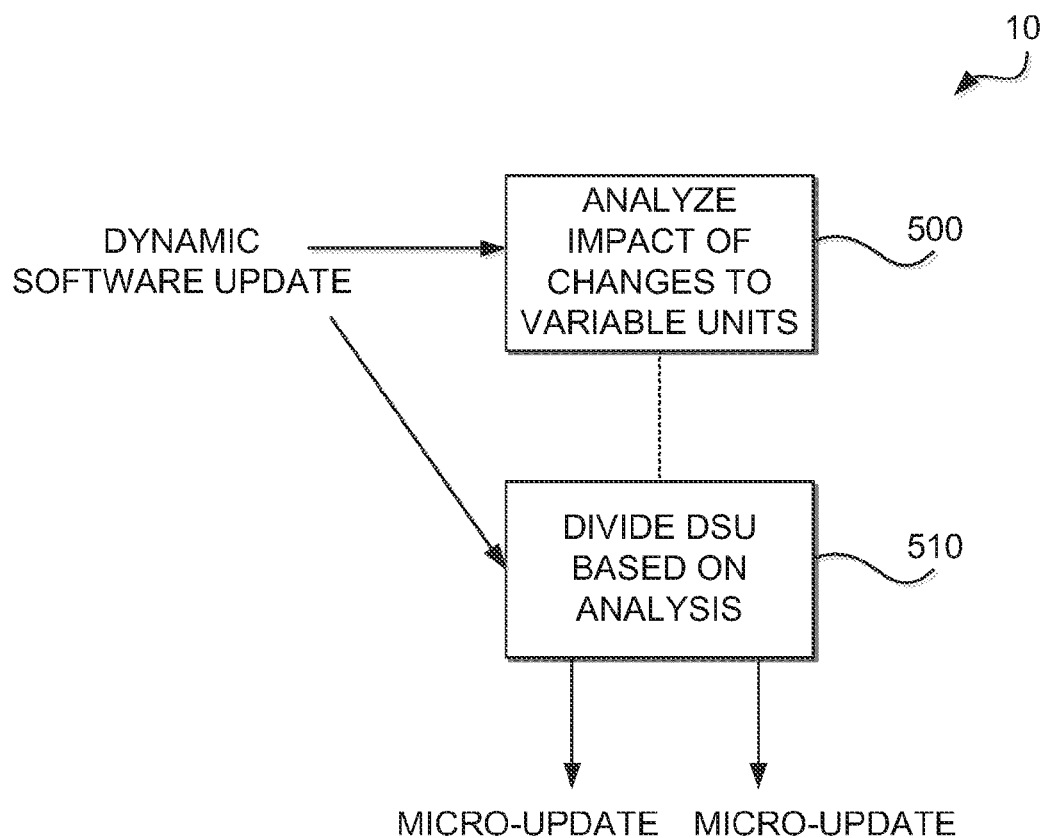
FIG. 5 is a flow chart illustrating yet another embodiment of a method for dynamically updating software.

FIG. 5 illustrates another exemplary method 10 for dynamically updating software. A computer readable medium stores instructions for performing the method 10. The instructions cause a computer to analyze the impact of changes to variable units of a dynamic software update on the software (Block 500); and divide the dynamic software update into micro-updates each including at least one of the variable units based on the analysis (Block 510).

In one embodiment, the computer readable medium also causes the computer to build an interference graph containing nodes and edges. Each node represents one of the variable units being updated and each edge connects two nodes representing variable units having an impact expression with a non-zero intersection.

In another embodiment, the computer readable medium also causes the computer to identify a bug in the software and create the dynamic software update or dynamic patch to fix the bug. The computer readable medium further causes the computer to prepare the dynamic software update for installation; detect any errors in the dynamic software update; and apply each of the micro-updates of the dynamic software update to the software at a safepoint.

Figure 6:
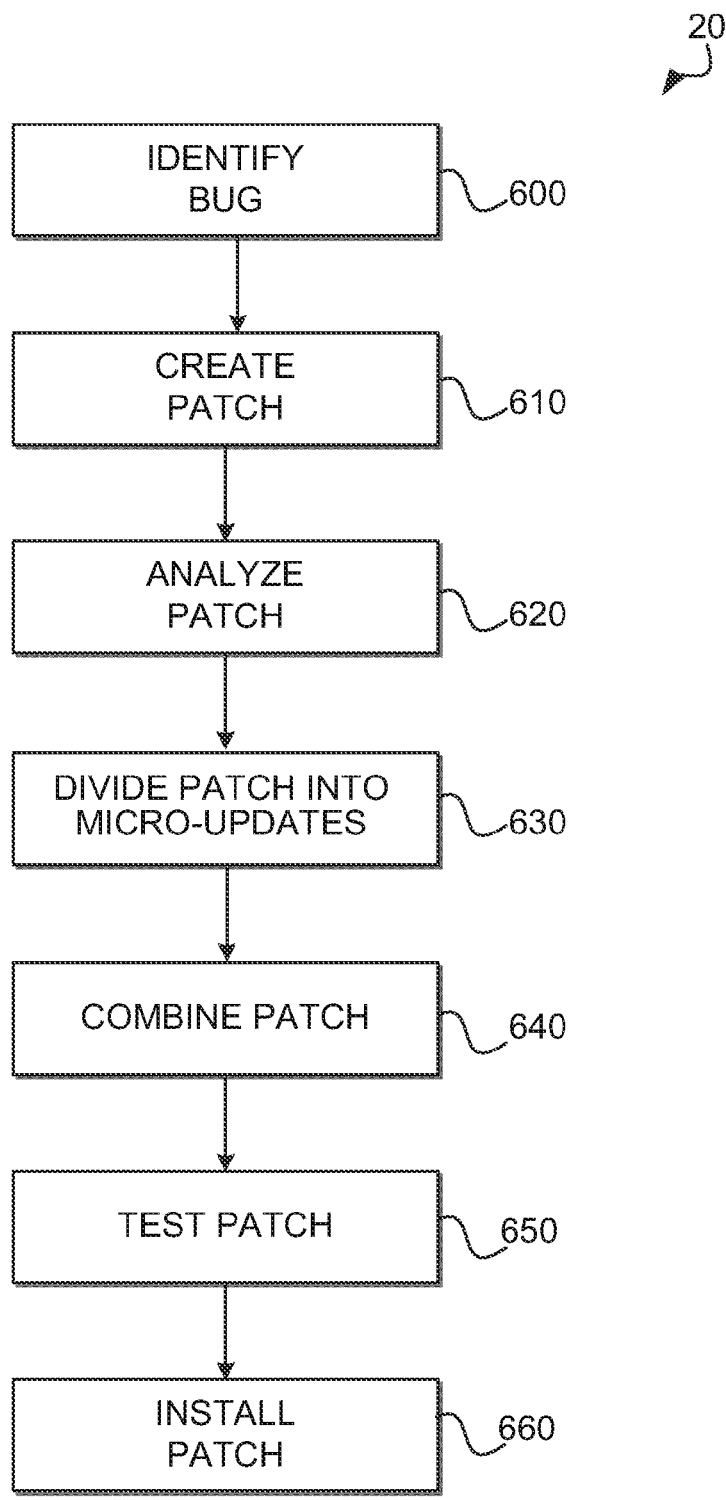
FIG. 6 is a flow chart illustrating another embodiment of a method for dynamically updating software.

FIG. 6 illustrates an overview of an exemplary patch process 20 that may be implemented by the system 27 of FIG. 1. The process first includes identifying a bug or defect in a software application (Block 600) and may include determining the root cause of the bug. The bug may be a defect related to a particular variable unit, such as a particular function, or may be a defect related to several variable units. A software provider or computer science engineer may identify the bug manually or use the bug identification 11 tool shown in FIG. 1. Next, the process includes creating a dynamic patch to fix the identified bug (Block 610). The software provider may use a variety of resources to create the dynamic patch, such as the patch developer program 30 of FIG. 1. The dynamic patch includes changes to at least one and typically several variable units of the software 29.

Next, the compiler 32, shown in FIG. 1, analyzes the unmodified software and the dynamic patch (Block 620). The compiler 32 may build an interference graph 22, as shown in FIG. 2, to determine the impact of the change to each variable unit of the dynamic patch on the software 29. The impact may be represented in an impact expression. The step of creating the interference graph 22 includes providing nodes 24 representing the variable units being updated or patched. Each node has an associated impact expression. Next, the method includes adding edges 26 between nodes 24 to connect two or more nodes 24 having impact expressions with non-zero intersections. A group of connected nodes 24 represents a group of variable units that have similar impacts on the software 29. This group is referred to as a connected component 28, as shown in FIG. 2.

In the process of FIG. 6, the compiler 32 of FIG. 1 may then use the interference graph 22 to divide the dynamic software update or dynamic patch into two or more micro-updates (Block 630). Each micro-update has a different impact on the software 29 and should be applied to the software 29 at a safepoint common to all variable units to be changed or modified by the micro-update. In an embodiment, the compiler 32 obtains the information contained in the interference graph 22 and divides the dynamic patch into micro-updates based on the connected components 28, wherein each connected component 28 forms one micro-update.

Once the dynamic patch is divided into the micro-updates, the compiler 32 sends the micro-updates to the DSU tool 34. The DSU tool 34 may combine the dynamic patch with other patches, or further prepare the dynamic patch for installation (Block 640). Next, the DSU tool 34 sends the dynamic patch to the patch tester 38, which identifies and corrects errors in the dynamic patch (Block 650). The patch tester 38 then sends the dynamic patch to the patch hub 40, which typically is operated by a system administrator who controls and has the ability to apply the dynamic patch to the software 29.

The process of FIG. 6 finally includes installing the dynamic patch on the software 29 while the software 29 is running (Block 660), specifically while the software 29 is providing operating instructions and while one or more of the variable units to be updated are active. The patch installer 44 of FIG. 1 may perform Block 660. The patch hub 40 conveys the dynamic patch to the patch installer 44 as a set of source files. The patch installer 44 then applies at least two of the micro-updates to the software 29 independently, for example at different times, while the software 29 is running. Each of the micro-updates may be applied to the software 29 at different times, but a few of the micro-updates may be clustered together as a macro-update and applied to the software 29 in the macro-update.

Figure 7:
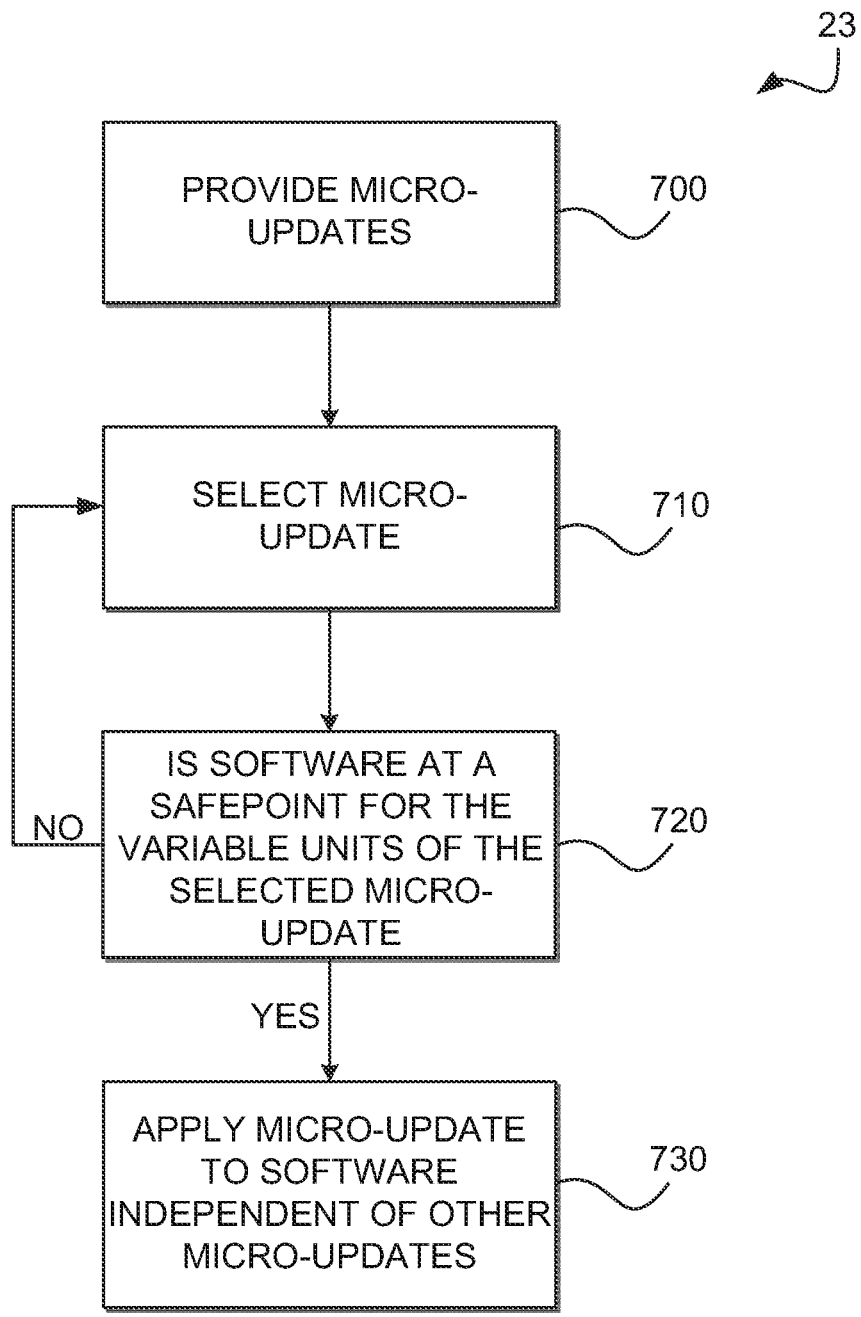
FIG. 7 is a flow chart illustrating another embodiment of a method for dynamically updating software.

FIG. 7 illustrates another exemplary method 23 for applying a dynamic software update. This method 23 may be performed primarily by the patch installer 44 and conducted at Block 660 of FIG. 6. The method 23 includes providing the dynamic patch including the micro-updates (Block 700) to the patch installer 44 and then applying each of the micro-updates to the software 29 during a safepoint (Blocks 710-730), which is a point in time during operation of the software 29 when all variable units of the particular micro-update are inactive, although variable units of other micro-updates may be active.

Once the micro-updates are provided to the patch installer 44 (Block 700), the patch installer 44 selects one of the micro-updates (Block 710) and determines whether the software 29 is at a safepoint for that particular micro-update (Block 720). The safepoint should be a safepoint common for each of the variable units of the micro-update. The micro-updates can be selected randomly or in a predetermined order. If the software 29 is at a safepoint for the variable units of the selected micro-update, then the patch installer 44 applies the micro-update to the software while the software is running (Block 730). However, if the software 29 is not at a safepoint for the selected micro-update, then block 710 is repeated and another micro-update is selected. Blocks 710-730 are repeated until all of the micro-updates are applied. At least two of the micro-updates have different safepoints and therefore are provided at different times. Each of the micro-updates may have a different safepoint. Two or more micro-updates having the same safepoints may be applied at the same time in a macro-update.

In the exemplary method 23 of FIG. 7, the step of determining whether the software is at a safepoint (Block 720) may include determining whether the variable units of a micro-update are active and currently being executed by the threads of the software 29. This task may be performed by first obtaining a list of variable units of the software 29 to be patched, and obtaining a list of the variable units currently active such that the safepoints can be determined. The compiler 32 of FIG. 1 may prepare and continuously update the list of active variable units. The interference graph 22 also provides some indication of when the variable units are active, as the interference graph 22 indicates which variable units have a common impact on the software 29.

For example, the method 23 of FIG. 7 may include selecting a first one of the micro-updates of the dynamic patch and determining whether any of the variable units to be changed by the first micro-update are currently active. This step can be conducted by referring to the list of active variable units. If the variable units of the first micro-update selected are inactive, then the method includes applying the micro-update to the software. If one or more variable units of the first micro-updated selected are active, then the method includes selecting a second one of the micro-updates of the dynamic patch and determining whether any of the variable units to be changed by the second micro-update are currently active. If the variable units of the second micro-update are inactive, then the micro-update is applied. After obtaining and applying one of the micro-updates, the method includes selecting one of the remaining micro-updates in the dynamic patch and determining whether any of the variable units of the micro-update are active. If the variable units of the micro-update are inactive, then the micro-update is applied. If one or more variable units of the selected micro-update are active, then another one of the remaining micro-updates is selected. The steps are repeated until each of the remaining micro-updates are applied to the software. In one embodiment, the method includes identifying one of the micro-updates containing only inactive variable units, based on the list of active variable units, and applying that micro-update to the software. If a safepoint for any of the micro-updates is difficult to reach, the method can include allowing the software application to continue running for a period of time until a safepoint is reached or re-starting the software application.

Figure 8:
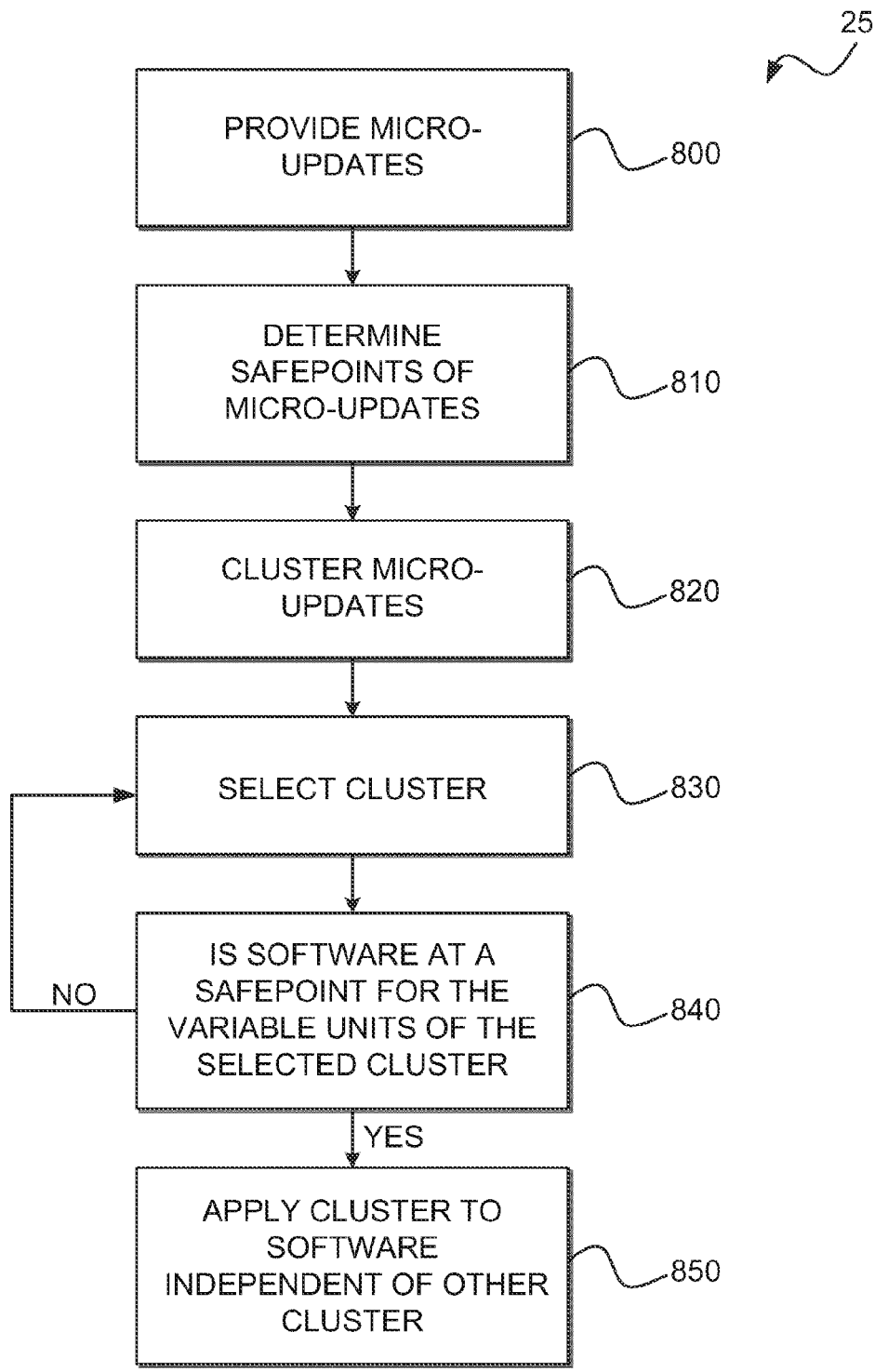
FIG. 8 is a flow chart illustrating yet another embodiment of a method for dynamically updating software.

FIG. 8 illustrates an alternate embodiment of a method 25 for applying a dynamic software update. In this embodiment, the variable units of two or more micro-updates are at safepoints at the same time, and therefore the patch installer may cluster those micro-updates together and apply them to the software at the same time. The method 25 of FIG. 8 includes providing the micro-updates (Block 800), determining the safepoints for the variable units of each of the micro-updates (Block 810), and then clustering the micro-updates with variable units having the same safepoints together (Block 820). For example, a cluster may include two micro-updates each including variable units that are inactive during a common period of time.

The method 25 of FIG. 8 next includes selecting one of the clusters (Block 830) and determining whether the software is at a safepoint for that particular cluster (Block 840). The software may be at a safepoint if all the variable units of the cluster are inactive. The clusters may be selected randomly or in a predetermined order. If the software is at a safepoint, then the patch installer may apply the cluster while the software is running, independent of the other clusters. (Block 850) However, if the software is not at a safepoint, then Block 830 is repeated and another cluster is selected. Blocks 830-850 are repeated until all of the clusters are applied to the software.

The system and method described herein may automatically divide a dynamic software update into a plurality of micro-updates using compiler analysis. A programmer does not need to spend a significant amount of time breaking the dynamic patch into smaller chunks manually. Therefore the dynamic patch may be applied to a running software application in a shorter period of time than prior art system and methods used to apply dynamic patches. In comparative systems, the dynamic patch is not applied until each of the variable units to be updated in the entire dynamic patch is inactive and a safepoint is reached. If the dynamic patch is large, it may take a significant amount of time to reach the safepoint for all of the variable units. In other comparative systems, a programmer may manually break down the patch, which also takes a significant amount of time. However, using the system and method described herein, the dynamic patch may be divided into micro-updates automatically using the compiler analysis. Further, even if some of the variable units to be updated by the dynamic patch are active while the software is running, other inactive variable units can be updated in the meantime. The micro-updates may be applied separately and at different times so that the entire dynamic patch is applied in a shorter amount of time.

We claim:

1. A computer-implemented method for dynamically updating software, comprising:
    a computer receiving a dynamic patch to update a set of variable units of the software;
    the computer constructing an interference graph of the dynamic patch by:
        generating a node corresponding to each variable unit of the software, and
        generating edges connecting nodes having impact expressions with a non-zero intersection, wherein a plurality of connected nodes is a connected component, and wherein a non-zero intersection occurs when the impact expression of two nodes intersects;
    the computer dividing the dynamic patch into a plurality of micro-updates each corresponding to one of the connected components; and
    the computer applying at least two of the micro-updates to the software independently while the software is running, comprising:
        selecting a first micro-update from the plurality of micro-updates, and
        when the variable units of the selected micro-update are not at a safepoint, waiting until the variable units are at a safepoint before applying the selected micro-update to the software.

2. The method of claim 1, wherein the micro-updates are selected in one of a predetermined mode and a random mode.

3. The method of claim 1, wherein applying the at least two micro-updates to the software independently comprises applying the at least two micro-updates to the software at different instants of time.

4. The method of claim 3, comprising:
    clustering two or more of the plurality of micro-updates into a macro-update; and
    applying the macro-update to the software.

5. The method of claim 4, comprising determining that the two or more micro-updates of the macro-update will have a common safepoint.

6. The method of claim 1, comprising:
    generating the impact expressions using at least one of mod/ref information, points-to information, and call graph information of the variable units.

7. The method of claim 6, comprising:
    generating the mod/ref information, the points-to information, and the call graph information of the variable units by analyzing sources of the software to be updated.

8. The method of claim 1, comprising providing the micro-updates in a source file of a non-transitory computer-readable medium.

9. The method of claim 1, wherein the variable units comprise functions, type definitions, and data structures, and wherein a connected component comprises a single variable unit.

10. The method of claim 1, comprising the computer receiving, from a programmer, a specification of at least one safepoint.

11. The method of claim 1, comprising the computer determining at least one safepoint, comprising the computer performing an active function check of variable units of at least one of the micro-updates.

12. A computer-implemented method for dynamically updating software while the software is executed by a computer, comprising:
    the computer receiving a software patch and an unmodified version of a software program, the software patch comprising a plurality of variable units;
    the computer generating an impact expression for each variable unit of the software patch;
    the computer dividing the software patch into a plurality of micro-updates, each micro-update comprising one of variable units having intersecting impact expressions and a single variable unit; and
    while the software program is running, the computer applying at least one micro-update to the software program independent of any other micro-updates, comprising:
        selecting a first micro-update,
        waiting until all variable units of the selected first micro-update are inactive,
        applying the selected first micro-update to the software patch, and
        repeating the selecting, waiting, and applying until all micro-updates are applied to the software program.

13. A non-transitory computer-readable storage medium storing instructions for performing a method that dynamically updates software, the instructions, when executed, causing a computer to:
    generate an impact expression for each of a plurality of variable units of a dynamic software update;
    divide the dynamic software update into a plurality of micro-updates, each micro-update comprising variable units having intersecting impact expressions; and
    while the software is running, apply at least one micro-update to the software independent of any other micro-updates, wherein the computer executes instructions to:
        select a first micro-update of the plurality of micro-updates,
        wait until the variable units of the selected first micro-update are inactive,
        apply the selected first micro-update to the software,
        select a second micro-update of the plurality of micro-updates,
        wait until the variable units of the selected second micro-update are inactive,
        and apply the selected second micro-update to the software.

14. The non-transitory computer-readable storage medium of claim 13, wherein the micro-updates are selected in one of a predetermined mode and a random mode.

15. The non-transitory computer-readable storage medium of claim 13, further causing the computer to:
    identify a bug in the software;
    create the dynamic software update to fix the bug;
    prepare the dynamic software update for installation; and
    detect any errors in the dynamic software update.

* * * * *